(12) United States Patent
Kweon et al.

(10) Patent No.: US 6,712,883 B2
(45) Date of Patent: Mar. 30, 2004

(54) APPARATUS AND METHOD FOR DEAERATING LIQUID CRYSTAL

(75) Inventors: Hyug Jin Kweon, Kumi-shi (KR); Hae Joon Son, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 94 days.

(21) Appl. No.: 10/128,453

(22) Filed: Apr. 24, 2002

(65) Prior Publication Data

US 2003/0159582 A1 Aug. 28, 2003

(30) Foreign Application Priority Data

Feb. 25, 2002 (KR) .................................. P 2002-9960

(51) Int. Cl.[7] .............................................. B01D 19/00
(52) U.S. Cl. ........................... 95/260; 95/261; 95/266; 96/193; 96/194; 96/196; 96/214; 96/216
(58) Field of Search ..................... 95/241, 247, 248, 95/260, 261, 266; 210/188; 96/155, 193, 194, 196, 204, 214, 216

(56) References Cited

U.S. PATENT DOCUMENTS

| | | | |
|---|---|---|---|
| 3,866,313 A | * | 2/1975 | Yih |
| 3,978,580 A | | 9/1976 | Leupp et al. |
| 4,094,058 A | | 6/1978 | Yasutake et al. .......... 29/592 R |
| 4,653,864 A | | 3/1987 | Baron et al. |
| 4,691,995 A | | 9/1987 | Yamazaki et al. ...... 350/331 R |
| 4,699,636 A | * | 10/1987 | Bofinger et al. |
| 4,775,225 A | | 10/1988 | Tsuboyama et al. |
| 5,247,377 A | | 9/1993 | Omeis et al. |
| 5,263,888 A | | 11/1993 | Ishihara et al. |
| 5,379,139 A | | 1/1995 | Sato et al. |
| 5,406,989 A | | 4/1995 | Abe |
| 5,499,128 A | | 3/1996 | Hasegawa et al. |
| 5,507,323 A | | 4/1996 | Abe |
| 5,511,591 A | | 4/1996 | Abe |
| 5,539,545 A | | 7/1996 | Shimizu et al. |
| 5,548,429 A | | 8/1996 | Tsujita |
| 5,642,214 A | | 6/1997 | Ishii et al. |
| 5,673,750 A | * | 10/1997 | Tsubone et al. |
| 5,680,189 A | | 10/1997 | Shimizu et al. |
| 5,742,370 A | | 4/1998 | Kim et al. |
| 5,757,451 A | | 5/1998 | Miyazaki et al. |
| 5,847,782 A | * | 12/1998 | Imazeki et al. |
| 5,852,484 A | | 12/1998 | Inoue et al. |
| 5,854,664 A | | 12/1998 | Inoue et al. |
| 5,861,932 A | | 1/1999 | Inata et al. |
| 5,862,839 A | * | 1/1999 | Nakamura et al. |
| 5,865,220 A | * | 2/1999 | Nakamura et al. |
| 5,875,922 A | | 3/1999 | Chastine et al. ................ 222/1 |
| 5,952,676 A | | 9/1999 | Sato et al. |
| 5,956,112 A | | 9/1999 | Fujimori et al. |
| 5,993,518 A | * | 11/1999 | Tateyama |
| 6,011,609 A | | 1/2000 | Kato et al. |
| 6,016,178 A | | 1/2000 | Kataoka et al. |

(List continued on next page.)

FOREIGN PATENT DOCUMENTS

| | | |
|---|---|---|
| EP | 1 003 066 A1 | 5/2000 |
| JP | 51-065656 | 6/1976 |
| JP | 59-057221 | 4/1984 |

(List continued on next page.)

*Primary Examiner*—Duane S. Smith
(74) *Attorney, Agent, or Firm*—Morgan, Lewis & Bockius LLP

(57) ABSTRACT

An apparatus and method are provided for deaerating liquid crystal contained in at least one liquid crystal container. The apparatus includes a chamber, a holder, a displacement mechanism, a vacuum system and a gas supply. The chamber has an opening to provide access to an interior of the chamber and a cover to seal the opening. The holder is disposed in the chamber to hold the liquid crystal container having the liquid crystal while the displacement mechanism displaces the at least one container. Here, the vacuum system creates a vacuum state in the chamber during deaeration, and the gas supply restores the chamber to atmospheric pressure.

23 Claims, 2 Drawing Sheets

U.S. PATENT DOCUMENTS

| | | | | |
|---|---|---|---|---|
| 6,029,371 | A | * | 2/2000 | Kamikawa et al. |
| 6,055,035 | A | | 4/2000 | Von Gutfeld et al. |
| 6,067,727 | A | * | 5/2000 | Muraoka |
| 6,095,203 | A | * | 8/2000 | Yamamoto et al. |
| 6,113,698 | A | * | 9/2000 | Raaijmakers et al. |
| 6,126,725 | A | * | 10/2000 | Tateyama |
| 6,163,357 | A | | 12/2000 | Nakamura |
| 6,182,376 | B1 | * | 2/2001 | Shin et al. |
| 6,224,677 | B1 | * | 5/2001 | Nozawa et al. |
| 6,226,067 | B1 | | 5/2001 | Nishiguchi et al. |
| 6,263,587 | B1 | * | 7/2001 | Raaijmakers et al. |
| 6,304,306 | B1 | | 10/2001 | Shiomi et al. |
| 6,304,311 | B1 | | 10/2001 | Egami et al. ............ 349/189 |
| 6,392,736 | B1 | * | 5/2002 | Furukawa et al. |
| 6,414,733 | B1 | | 7/2002 | Ishikawa et al. |
| 2001/0021000 | A1 | | 9/2001 | Egami ............ 349/187 |
| 2002/0126269 | A1 | * | 9/2002 | Sato |
| 2003/0159582 | A1 | * | 8/2003 | Kweon et al. |

FOREIGN PATENT DOCUMENTS

| | | |
|---|---|---|
| JP | 59-195222 | 11/1984 |
| JP | 60-111221 | 6/1985 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

* cited by examiner

APPARATUS AND METHOD FOR DEAERATING LIQUID CRYSTAL

This application claims the benefit of the Korean Application No. P2002-9960 filed on Feb. 25, 2002, which is hereby incorporated by reference.

BACKGROUND OF THE INVENTION

1. Field of the Invention

The present invention relates to an apparatus and a method for preparing liquid crystal to be dispensed onto a substrate, and more particularly, to an apparatus and a method for deaerating liquid crystal before dispensing the liquid crystal onto the substrate.

2. Discussion of the Related Art

With rapid development of an information-oriented society, a need for an information display device having high-performance characteristics such as good image quality, light weight, small thickness, and low power consumption has correspondingly been increased. To meet this need, there has been much research directed toward various flat panel display devices, such as liquid crystal display devices (LCD), plasma display panels (PDP), electro luminescent displays (ELD), vacuum fluorescent displays (VFD). Some of these technologies have already been applied in various applications as the information display device.

Of above various flat panel display devices, LCD is currently the most widely used due to its ability to meet the above needs. In fact, in portable devices such as notebook PC computers, LCD technology has replaced cathode ray tube (CRT) technology. Moreover, even in desktop type displays such as PC monitors and TV monitors, LCD technology has been developed and employed to be used in replacing CRT technology.

A liquid crystal cell includes two opposing substrates and a liquid crystal material filled between the substrates. Liquid crystal is a phase of material having intermediate properties between the liquid and the solid such as fluidity of liquids but long-range order of solids. The liquid crystal material, in an intermediate state between the liquid and the solid, has an optical anisotropy due to its long-range orientational order as well as mechanical fluidity. An LCD is manufactured through a number of processes such as an array process, a color filter process, a liquid crystal cell process, and a module process.

An array process is a process repeating a deposition, a photolithography, and an etching to form a thin film transistor (TFT) array on a first substrate (TFT substrate). A color filter process is a process for forming an ITO (Indium Tin Oxide) film for a common electrode, after red, green, and blue color filters (CF) of dyes or pigments are formed on a second substrate (CF substrate) having a black matrix formed thereon.

A liquid crystal cell process is a process of assembling the TFT substrate and the CF substrate prepared by the array process and the color filter process, respectively. Generally, an empty liquid crystal cell is formed with a fixed thin gap between the first substrate and the second substrate. Then, the liquid crystal is filled through an opening around the gap to form a liquid crystal panel. A module process is a process for assembling a driving circuit part for processing input and output signals, connecting the liquid crystal panel to a signal processor, and assembling some frames, thereby completing the liquid crystal module.

The step of filling liquid crystal into the liquid crystal cell in the liquid crystal cell process step can be explained as follows.

In the liquid crystal filling step, a liquid crystal material is contained in a container disposed in a chamber. The chamber is maintained in a vacuum state for removing moisture and air dissolved in the liquid crystal material or contained inside the container. While maintaining the vacuum state of the chamber, a liquid crystal filling hole in the empty liquid crystal cell is dipped in the container, and brought into contact with the liquid crystal material. Then, the chamber is vented from a higher vacuum state to a lower vacuum state, and eventually to the atmospheric pressure state. Accordingly, the liquid crystal material is filled into the empty liquid crystal cell through the liquid crystal filling hole by a pressure difference between a pressure in the liquid crystal cell and a pressure in the chamber.

However, the above described liquid crystal filling method has poor productivity because the method needs long time for the liquid crystal filling. That is, before the liquid crystal material is filled in the liquid crystal cell, the large assembled panel must be cut into unit panels, a part of the unit panel must be dipped into the container, and the liquid crystal filling hole must be brought into contact with the liquid crystal material while the chamber is kept at a vacuum state. Moreover, a large sized LCD is liable to have some defects coming from imperfect filling of the liquid crystal material into the cell.

With regard to this, a liquid crystal dropping method has been developed in which a fixed amount of the liquid crystal is dropped onto an inner surface of the TFT substrate in a corresponding area on the TFT substrate inside a main sealing area formed around the CF substrate. Then, the TFT substrate and the CF substrate are assembled into a large liquid crystal panel in a vacuum chamber. The liquid crystal cell process using the liquid crystal dropping method can be explained as follows.

Referring to FIG. 1, an orientation step (1S) in which an orientation material is coated on the TFT substrate and the CF substrate, and mechanical rubbing is carried out on the both substrates for having molecules of the liquid crystal material oriented, carried out. Then, the TFT substrate and the color filter substrate are cleaned (2S).

The TFT substrate has a plurality of gate lines running in one direction at fixed intervals, and a plurality of data lines running in a direction perpendicular to the gate lines at fixed intervals. A plurality of thin film transistors and pixel electrodes are in a matrix pixel region defined by the gate lines and the data lines. The CF substrate has a black matrix layer, a color filter, and a common electrode. Hence, the black matrix layer shields a light leakage of parts except the pixel region.

Then, the cleaned CF substrate is loaded on a stage of a seal dispenser, and a sealing material is coated on a periphery of unit panel areas on the CF substrate (3S). The sealing material may be a photo-sensitive resin, or thermo-curing resin. Meanwhile, no filling hole or sealing structure for filling the cell with liquid crystal is required.

At the same time, the cleaned TFT substrate is loaded on a stage of a silver (Ag) dispenser, and a silver paste material is dispensed into a common voltage supply line of the TFT substrate in the form of dots (5S). Then, the TFT substrate is transferred to an LC dispenser, and liquid crystal material is dropped (dispensed) onto an active array region of each unit panel area (6S). The liquid crystal dropping process is carried out as follows.

After a liquid crystal material is filled into an LC syringe before the LC syringe is assembled and set in the production line, moisture and air dissolved in the liquid crystal material is removed under a vacuum state (7S). Then, the liquid crystal syringe is assembled and set (8S), and mounted on the liquid crystal dispenser (9S). When the TFT substrate is loaded onto a stage of the liquid crystal dispenser, the liquid crystal material is dispensed therefrom using the liquid crystal syringe (6S) by dropping a fixed amount of the liquid crystal material onto the TFT substrate at a predetermined pitch inside a area on the TFT substrate corresponding to a coating area of the sealing material of the CF substrate (i.e., the pixel region).

After the TFT substrate and the CF substrate are loaded into a vacuum assembling chamber, the TFT substrate and the CF substrate are assembled such that the dropped liquid crystal is uniformly spread over unit panel areas (10S). Then, the sealing material is cured (10S). The assembled TFT substrate and color filter substrate, that is, a large panel, is cut into individual unit panels (11S). Each unit panel is ground and inspected (12S), thereby completing the LCD unit panel.

However, the above method for manufacturing a liquid crystal display device having the liquid crystal dropping method applied thereto has the following problems. Moisture and air dissolved in liquid crystal may cause imperfect filling of liquid crystal (i.e., generation of empty areas in liquid crystal panel after liquid crystal filling process step), reduction of resistivity of liquid crystal and voltage holding ratio of liquid crystal panel, and eventually reduction of image quality. Therefore, moisture and air dissolved in liquid crystal must be thoroughly removed before dropping (dispensing) the liquid crystal.

The deaeration process step described above is carried out under the vacuum state before the liquid crystal syringe containing liquid crystal is assembled and set. After the deaeration step, the liquid crystal syringe is assembled and set to be mounted on the liquid crystal dispenser. However, in the described deaeration process, there have been some problems in that the small contact area between the liquid crystal in the syringe and the exterior atmosphere requires a high vacuum state and a long process time. This difficulty in the deaeration process step causes inadequate deaeration, thereby resulting in defective LCD unit panels.

SUMMARY OF THE INVENTION

Accordingly, the present invention is directed to an apparatus and a method for deaerating a liquid crystal that substantially obviates one or more of the problems due to limitations and disadvantage of the related art.

An object of the present invention is to provide an apparatus and a method for efficiently deaerating a liquid crystal.

Another object of the present invention is to provide an apparatus and a method for manufacturing LCD unit panels with improved yields at low cost.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for deaerating liquid crystal contained in at least one liquid crystal container comprises a chamber having an opening to provide access to an interior of the chamber and a cover to seal the opening; a holder disposed in the chamber to hold the at least one liquid crystal container having the liquid crystal; a displacement mechanism to displace the at least one container; a vacuum system to create a vacuum state in the chamber; and a gas supply to restore the chamber to atmospheric pressure.

In another aspect, a method for deaerating liquid crystal comprises the steps of filling the liquid crystal into at least one liquid crystal container; positioning the at least one liquid crystal container having the liquid crystal filled therein in a chamber; sealing the chamber; evacuating the chamber to create a vacuum state in the chamber; causing a displacement of the container positioned in the chamber to disturb the liquid crystal; and restoring the chamber to atmospheric pressure.

In another aspect, an apparatus for deaerating liquid crystal contained in at least one liquid crystal container comprises means for filling the liquid crystal into at least one liquid crystal container; means for holding the at least one liquid crystal container having the liquid crystal filled therein in a chamber; means for sealing the chamber; means for evacuating the chamber to create a vacuum state in the chamber; means for displacing the container to disturb the liquid crystal; and means for restoring the chamber to atmospheric pressure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
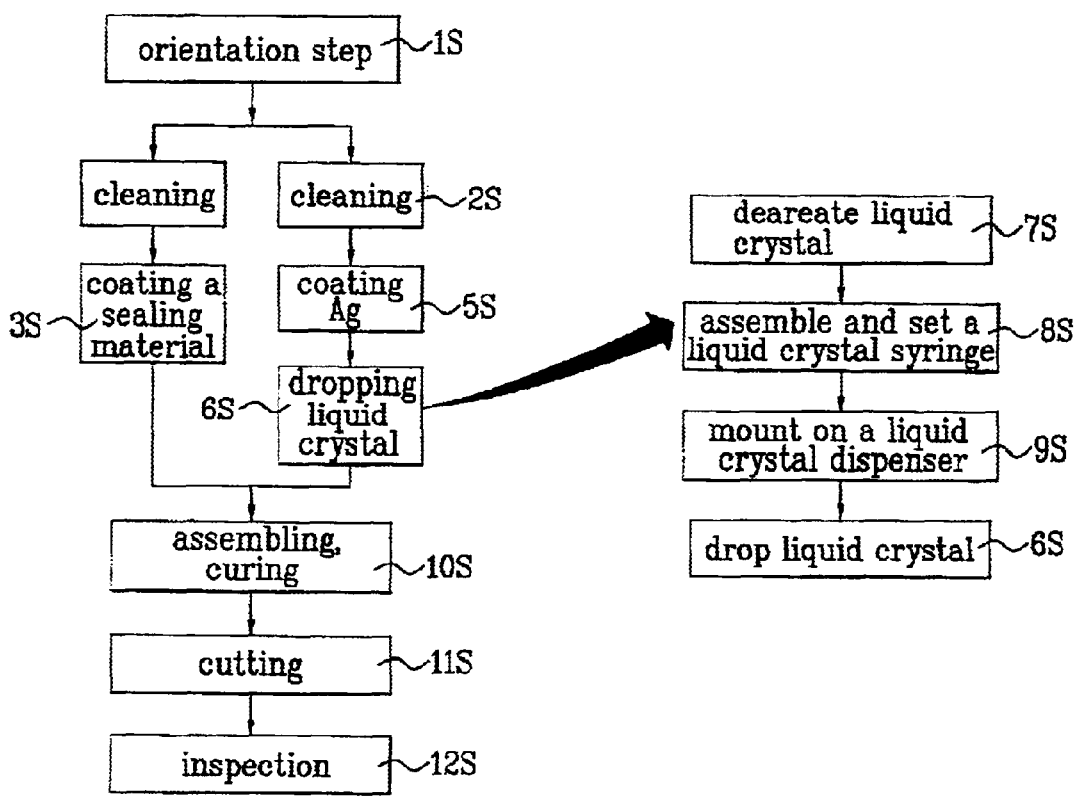
FIG. 1 is a flow chart showing the steps of a related art method for manufacturing a liquid crystal display device having a liquid crystal dropping method applied thereto.
Figure 2:
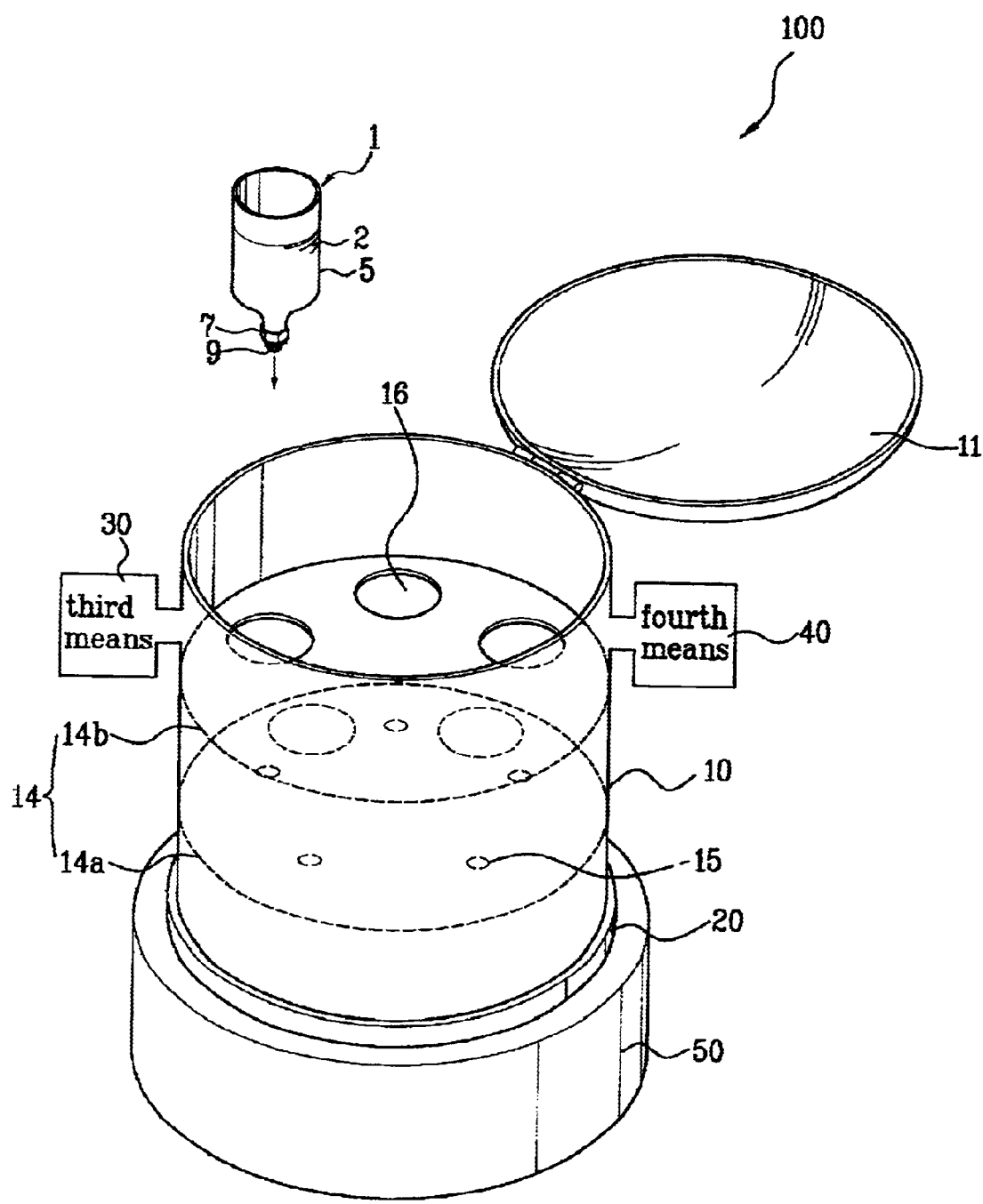
FIG. 2 is a perspective view illustrating an exemplary apparatus and method for deaerating a liquid crystal in accordance with an embodiment of the present invention.

FIG. 2 is a perspective view illustrating an exemplary apparatus for deaerating liquid crystal used in manufacturing a liquid crystal display device by the liquid crystal dropping method in accordance with the present invention.

Referring to FIG. 2, a plurality of liquid crystal syringes 1 (only one syringe is shown in the drawing) filled with a liquid crystal 2 to be deaerated are placed in a chamber 10. Of course, the chamber 10 need not hold more than one liquid crystal syringe 1, but it is more efficient to deaerate more than one at a time. The liquid crystal syringes 1 is placed in the chamber 10 for deaerating the liquid crystal 2 using a deaerating apparatus 100. At this time, the liquid crystal syringes 1 are not yet assembled and set. After deaeration process step is finished, the liquid crystal syringe 1 will be assembled and set to be mounted on the liquid crystal dispenser in the production line. The liquid crystal syringe 1 may include, for example, a container 5 for containing the liquid crystal 2, an opening and shutting part 7 connected to the container 5 for dispensing the liquid crystal 2, and a nozzle 9 connected to the opening and shutting part 7 having the liquid crystal 2 dispensed. Of course, other syringe types or liquid crystal dispensers may be used in accordance with the present invention.

There is a first portion (holder) 14 in the chamber 10 to hold the liquid crystal syringe 1. The first portion 14 may include a first holding part 14a for holding the opening and shutting part 7 of the liquid crystal syringe 1, and a second holding part 14b for holding the container 5. The first holding part 14a has a plurality of first holes 15 matched to a diameter of the opening and shutting part 7, and the second holding part 14b has a plurality of second holes 16 matched to a diameter of the container 5. The first and second holding parts 14a and 14b hold the liquid crystal syringe 1. Of course, other configurations for the first portion 14 may be used as long as such configurations serve as a holder to securely hold the liquid crystal syringes 1.

There is a displacing mechanism 20 to cause displacements of the chamber 10. That is, the displacing mechanism 20 may vibrate and/or rotate the chamber 10. The displacing mechanism 20 may be located below the chamber 10 to vibrate and/or rotate the chamber 10, thereby disturbing or inducing flow in the liquid crystal 2 in the liquid crystal syringe 1 in the chamber 1. Generally, a circular motion is preferred to circulate the liquid crystal 2 without causing air bubbles.

The deaerating apparatus 100 may also include a vacuum system 30 for evacuating the chamber 10, a gas supply 40 for restoring the chamber 10 to an atmospheric pressure state, and a body 50 for supporting the chamber 10 and the displacing mechanism 20. The vacuum system 30 (for example, a vacuum pump) reduces a pressure of the chamber 10 by discharging air from the chamber 10 to the atmosphere. The gas supply 40 inflows gas, preferably an inert gas such as nitrogen gas (N2), into the chamber 10 to restore the chamber 10 to an atmospheric pressure state again.

The method for deaerating the liquid crystal 2 by using the apparatus 100 in accordance with the present invention can be explained as follows.

At first, a cover 11 is opened to mount the liquid crystal syringe 1 on the first and second holding parts 14a and 14b in the chamber 10. Then, the cover 11 is closed to seal the chamber 10, and the displacing mechanism 20 starts to operate, thereby circulating the liquid crystal 2 in the liquid crystal syringe 1. At the same time, the vacuum system 30 starts to evacuate air inside of the chamber 10 through a vacuum line (not shown), thereby removing moisture and air in the liquid crystal 2 due to a pressure difference between the chamber 10 and the liquid crystal 2. The foregoing deaeration process step can remove moisture and air in the liquid crystal 2 effectively and quickly since the deaeration process step is carried out while flowing of the liquid crystal 2. That is, liquid crystal flow is induced in the up down, left, and right directions or rotational directions.

To finish the deaeration process, the gas supply 40 provides nitrogen gas (N2) into the chamber 10 through a nitrogen gas line (not shown); thereby restoring the pressure of the chamber 10 to the atmospheric pressure.

After completion of all the foregoing process steps, the liquid crystal syringe 1 is taken out of the chamber 10, and the liquid crystal dropping process is carried out. That is, though not shown, after the liquid crystal syringe 1 having been deaerated, it is assembled and set to be mounted on the liquid crystal dispenser of the production line. Then, the liquid crystal 2 is dropped and dispensed onto the pixel region of the TFT substrate or the color filter substrate to manufacture a large LCD panel. Here, a large LCD panel having a plurality of unit panels is formed.

Then, the TFT substrate and the color filter substrate are placed in assembling chamber, assembled into a large panel where the dropped liquid crystal is spread over uniformly in the unit panel areas. This may be conducted in a vacuum environment. Next, sealing material in the large panel is cured. Finally, the large panel is cut into individual unit panels, ground, and inspected.

As has been explained, the apparatus and method for deaerating a liquid crystal of the present invention have the following advantages. First, process time loss can be minimized by carrying out deaeration of a liquid crystal in a plurality of syringes placed in the chamber. Also, the deaeration process can remove moisture and air in the liquid crystal effectively and quickly since the deaeration process step is carried out while liquid crystal flow is induced. Further, the effective removal of moisture and air in the liquid crystal can reduce the occurrence of defective LCDs, thereby improving yield.

It will be apparent to those skilled in the art that various modifications and variations can be made in the device and method for deaerating liquid crystal of the present invention without departing from the spirit or scope of the invention. Thus, it is intended that the present invention cover the modifications and variations of this invention provided they come within the scope of the appended claims and their equivalents.

What is claimed is:

1. An apparatus for deaerating liquid crystal contained in at least one liquid crystal container, comprising:
    a chamber having an opening to provide access to an interior of the chamber and a cover to seal the opening;
    a holder disposed in the chamber to hold the at least one liquid crystal container having the liquid crystal;
    a displacement mechanism to displace the at least one container;
    a vacuum system to create a vacuum state in the chamber; and
    a gas supply to restore the chamber to atmospheric pressure.

2. The apparatus according to claim 1, wherein the displacement mechaninsm displaces the chamber having the liquid crystal container therein.

3. The apparatus according to claim 1, wherein the displacement includes at least one of vibrating and rotating.

4. The apparatus according to claim 1, wherein the displacement includes a substantially circular motion.

5. The apparatus according to claim 4, wherein the circular motion causes the liquid crystal contained in the liquid crystal container to circulate.

6. The apparatus according to claim 1, wherein the displacement induces a flow of the liquid crystal contained in the liquid crystal container.

7. The apparatus according to claim 1, wherein the liquid crystal container is a liquid crystal syringe dispenser including a main body portion for containing the liquid crystal, and a nozzle portion for dispensing the liquid crystal.

8. The apparatus according to claim 7, wherein the liquid crystal syringe dispenser further includes a valve structure for controlling the dispensing of the liquid crystal.

9. The apparatus according to claim 1, wherein the holder includes a first holding portion for holding a nozzle portion of the liquid crystal container and a second holding portion for holding a main body portion of the liquid crystal container.

10. The apparatus according to claim 9, wherein the first holding portion includes a first plate member defining at least one hole matched to a diameter of the nozzle portion and the second holding portion includes a second plate member defining at least one hole matched to a diameter of the main body portion.

11. A method for deaerating liquid crystal, comprising the steps of:

filling the liquid crystal into at least one liquid crystal container;

positioning the at least one liquid crystal container having the liquid crystal filled therein in a chamber;

sealing the chamber;

evacuating the chamber to create a vacuum state in the chamber;

causing a displacement of the container positioned in the chamber to disturb the liquid crystal; and restoring the chamber to atmospheric pressure.

12. The method according to claim 11, wherein the step of causing the displacement includes displacing the chamber having the liquid crystal container therein.

13. The method according to claim 11, wherein the step of causing the displacement includes at least one of vibrating and rotating.

14. The method according to claim 11, wherein the step of causing the displacement includes a substantially circular motion.

15. The method according to claim 14, wherein the circular motion causes the liquid crystal contained in the liquid crystal container to circulate.

16. The method according to claim 11, wherein the step of causing the displacement includes inducing a flow of the liquid crystal contained in the liquid crystal container.

17. The method according to claim 11, wherein the liquid crystal container is a liquid crystal syringe dispenser including a main body portion for containing the liquid crystal, and a nozzle portion for dispensing the liquid crystal.

18. The method according to claim 11, wherein the positioning step includes the step of positioning the at least one liquid crystal container in a holder that includes a first holding portion for holding a nozzle portion of the liquid crystal container and a second holding portion for holding a main body portion of the liquid crystal container wherein the first holding portion has a first plate member defining at least one hole matched to a diameter of the nozzle portion and wherein the second holding portion has a second plate member defining at least one hole matched to a diameter of the main body portion.

19. An apparatus for deaerating liquid crystal contained in at least one liquid crystal container, comprising:

means for filling the liquid crystal into at least one liquid crystal container;

means for holding the at least one liquid crystal container having the liquid crystal filled therein in a chamber;

means for sealing the chamber;

means for evacuating the chamber to create a vacuum state in the chamber;

means for displacing the container to disturb the liquid crystal; and means for restoring the chamber to atmospheric pressure.

20. The apparatus according to claim 19, wherein the displacing means displaces the chamber having the liquid crystal container therein.

21. The apparatus according to claim 19, wherein the displacing means displaces the container in a substantially circular motion.

22. The apparatus according to claim 21, wherein the circular motion causes the liquid crystal contained in the liquid crystal container to circulate.

23. The apparatus according to claim 19, wherein the displacing means induces a flow of the liquid crystal contained in the liquid crystal container.

* * * * *